July 30, 1940.     O. H. YOXSIMER     2,209,869
REFRIGERATION APPARATUS
Filed Jan. 4, 1940     2 Sheets-Sheet 1

WITNESSES:

INVENTOR
ORLAND H. YOXSIMER.
BY
ATTORNEY

Patented July 30, 1940

2,209,869

UNITED STATES PATENT OFFICE 2,209,869

REFRIGERATION APPARATUS

Orland H. Yoxsimer, Springfield, Mass., assignor to Westinghouse Electric & Manufacturing Company, East Pittsburgh, Pa., a corporation of Pennsylvania Application January 4, 1940, Serial No. 312,318

8 Claims. (Cl. 240—4)

This invention relates to refrigerator cabinets and more especially to a means for illuminating the interior of a food storage receptacle in a refrigerator cabinet.

Domestic refrigerator cabinets are usually provided with receptacles for the storage of moist foods such as fresh meats and vegetables. These receptacles are often made from opaque materials, such as enamelware, and the interior of these receptacles is not illuminated by the door-controlled light usually provided for such refrigerator cabinets.

It is, accordingly, an object of this invention to provide a means for illuminating the interior of such receptacles.

Another object of the invention is to deflect the light from a door-controlled illuminating lamp into the food storage receptacles in the cabinet when the receptacle is opened.

These and other objects are effected by my invention as will be apparent from the following description and claims taken in accordance with the accompanying drawings, forming a part of this application, in which:

Figure 1:
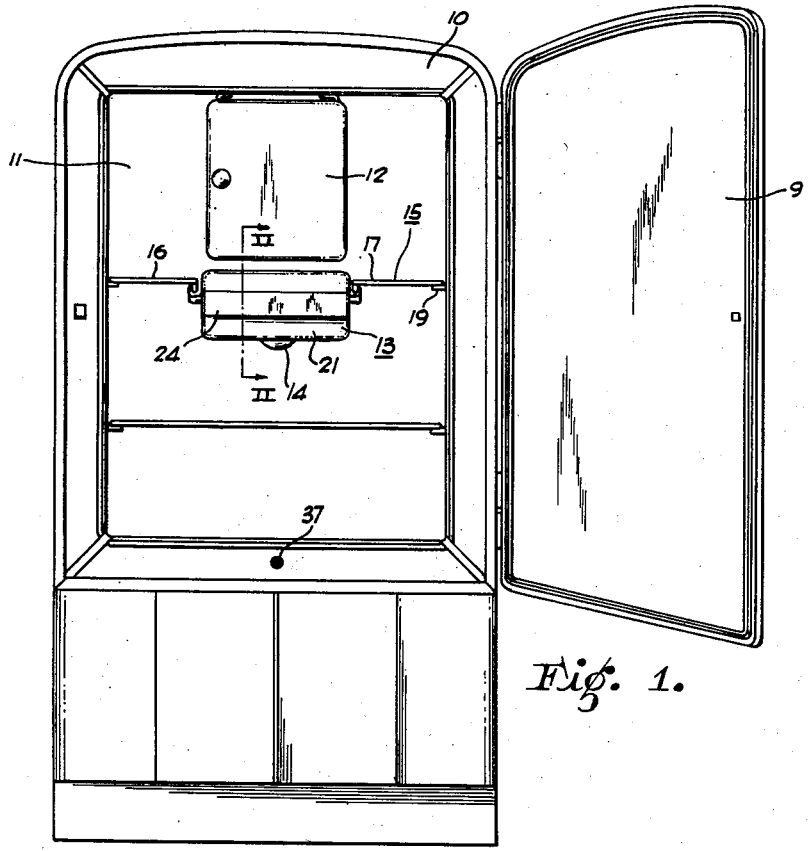
Fig. 1 is a front elevation of a refrigerator with the door opened to show the food receptacle of this invention.
Figure 4:
Fig. 4 is an elevation of a pair of slide rails which support the food receptacle; and, Fig. 5 is a detailed view showing a pair of the slide rails.
Figure 5:
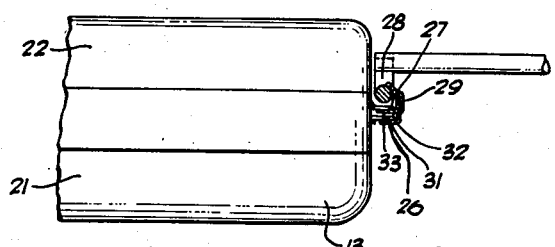
Figure 2:
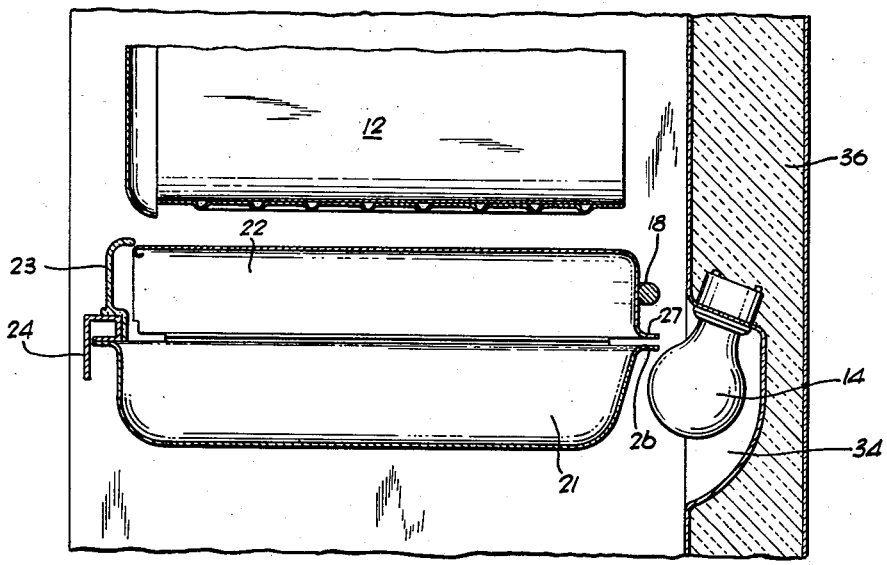
Fig. 2 is a section on the line II—II of the cabinet.

Referring now to the drawings for a detailed description of the invention, reference numeral 10 designates a refrigerator cabinet having an insulated chamber 11 therein and a door 9 therefor. An evaporator 12 is located in the upper portion of the insulated chamber 11 and below the evaporator 12 is the food storage receptacle 13 and the illuminating lamp 14 of this invention. The receptacle 13 is supported from a shelf 15. The shelf comprises two horizontal portions 16 and 17 which are joined at the rear of the insulated chamber 11 by a rod 18. The shelf 15 is supported on pins 19 in the side walls of the insulated chamber 11.

The food storage receptacle 13 comprises a pan-shaped base 21 and a cover 22 which is in the shape of an inverted pan but with the front wall of the pan removed. An upright wall 23, preferably of glass, is secured to the upper front edge of the base 21 and forms the front wall of the receptacle 13. The front wall of the base 21 is also provided with a handle 24 whereby the base 21 may be pulled forwardly. The base 21 is provided with an outwardly-turned peripheral flange 26 at its upper edge and the cover 22 is provided with a similar flange 27 at the two lower sides and the lower rear edge.

The edges of the shelf 15 adjacent the central opening thereof are each provided with a depending wire support 28 to which an angle member 29 is welded. One leg of each of the angle members 29 forms a horizontal rail 31 which engages one of the flanges 26 of the base 21 to support the same. A second angle member 32 is secured at the mid-section of each of the angle members 29 which angle members 32 provide horizontal rails 33 which engage the flange 27 of the cover 22 to support the same.

It will be apparent from the figures as thus far described that the base 21 is adapted to slide forwardly on the rails 31 when a pull is exerted on the handle 24, and that it may be slid forwardly for disengagement with the rails 31. The cover 22 may be removed in like manner after the base 21 is removed. It will be further apparent that, because of the absence of a front wall on the cover 22, large articles of food may be placed in the base 21 and the base slid into place underneath the cover 22 without interference therewith.

Figure 3:
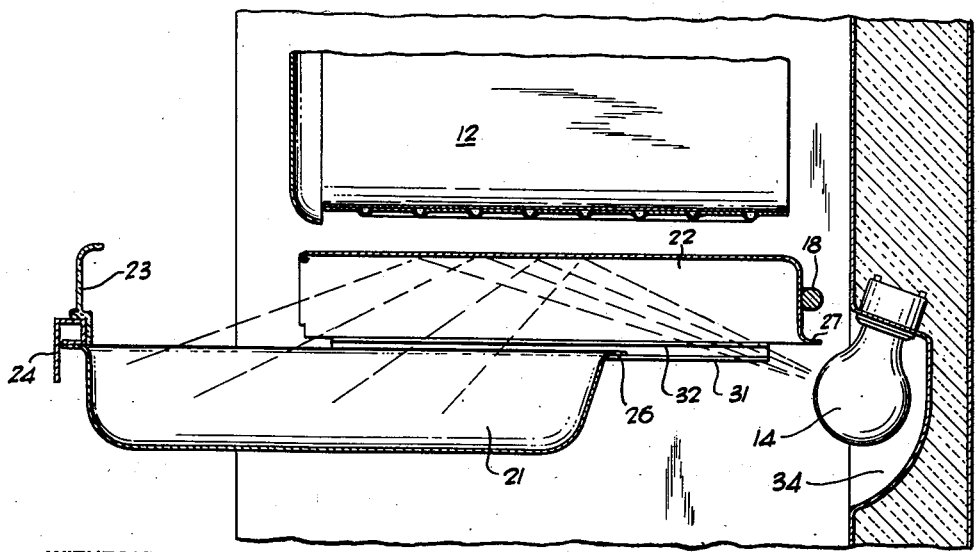
Fig. 3 is a view similar to Fig. 2, but with the food receptacle partially opened to show the manner of illuminating the interior thereof.

The lamp 14 is located in a recess 34 in the rear wall 36 of the cabinet 10 and is located with the luminous portion below the flange 27 of the cover 22. The lamp 14 may be controlled by a door-controlled switch 37 so that the lamp 14 lights only when the door 9 of the refrigerator 10 is opened. As will be best observed in Fig. 3, the lamp is so disposed in relation to the cover 22 that the light rays of the lamp 14 strike the upper inner surface of the cover 22 when the base 21 is partially slid from its closed position. These light rays are then reflected from the cover 22 to the interior of the base 21 and illuminate the food articles stored therein. The upper interior surface of the cover 22 preferably comprises a good light-reflecting surface, such as white porcelain enamel. The absence of a front wall on the cover 22 provides a fairly unobstructed view of the contents of the receptacle when the base 21 is partially withdrawn. The absence of this wall further permits the light reflected from the interior upper surface of the cover 22 to illuminate the contents of that portion of the base 21 which projects beyond the cover 22. The lamp 14 also illuminates the remainder of the interior of the insulated chamber 11 when the door is open.

The base 21 may be used as a defrost tray when the cover 22 and the contents of the base 21 are removed. The frost melting from the evaporator 12 will then drip into the base member 21.

From the above it will be observed that this invention provides a novel arrangement of the parts of a refrigerator for illuminating the interior of a substantially opaque food storage receptacle when the receptacle is partially opened, and for utilizing the usual food compartment lamp as the source of illumination.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a refrigerator, the combination of an insulated chamber, a substantially closed food storage receptacle therein comprising upper and lower portions, said lower portion being adapted for sliding movement relative to said upper portion, said upper portion having an interior light reflecting surface spaced from said lower portion and an illuminating lamp in said chamber and outside of said receptacle, said lamp being so positioned with respect to said receptacle that light from said lamp illuminates the upper interior light reflecting surface of said upper portion and said surface reflects the light toward said lower portion to illuminate the interior of said receptacle and the food stored therein.

2. In a refrigerator, the combination of an insulated chamber, a substantially closed food storage receptacle therein comprising upper and lower portions, said lower portion being adapted for sliding movement relative to said upper portion, said upper portion having an interior light reflecting surface spaced from said lower portion, and an illuminating lamp in said chamber and outside of said receptacle, said lamp being so positioned with respect to said receptacle that when the lower portion is partially slid from its substantially closed position, light from said lamp directly illuminates said upper interior light reflecting surface of said upper portion and said surface reflects the light toward said lower portion to illuminate the interior of said receptacle and the food stored therein.

3. In a refrigerator, the combination of an insulated chamber, a substantially closed food storage receptacle therein comprising an upper portion having an interior light reflecting surface and an opaque lower portion spaced from said light reflecting surface, said lower portion being adapted for sliding movement relative to said upper portion, and an illuminating lamp in said chamber and outside of said receptacle, said lamp being so positioned with respect to said receptacle that when the lower portion is partially slid from its substantially closed position, light from said lamp directly illuminates said upper interior light reflecting surface of said upper portion, said surface reflecting the illumination toward said lower portion to illuminate the interior of said receptacle and the food stored therein.

4. In a refrigerator, the combination of an insulated chamber, a substantially closed food storage receptacle therein comprising a cover and a base, said base being supported for substantially horizontal sliding movement relative to said cover, said cover having a down-turned portion which cooperates with said base to substantially close said receptacle said cover also having a light reflecting surface spaced from said base, and a lamp in said chamber and exterior of said receptacle, said lamp being so positioned that when said base is partially slid from its substantially closed position, said lamp illuminates said light reflecting surface of said cover through the opening formed between the down-turned portion of the cover and said base, and said light reflecting surface of said cover reflects said illumination towards said base.

5. In a refrigerator, the combination of an insulated chamber, a substantially closed food storage receptacle therein comprising a cover and a base, said base being supported for substantially horizontal sliding movement relative to said cover, said cover having an interior light reflecting surface and a down-turned portion which cooperates with said base to substantially close said receptacle, and a lamp in said chamber and exterior of said receptacle, said lamp being so positioned that, when said base is partially slid from its substantially closed position, said lamp illuminates portions of the interior reflecting surface of said cover through the opening formed between the down-turned portion of the cover and said base, and said cover reflects said illumination towards said base.

6. In a refrigerator, the combination of an insulated chamber, a substantially closed food storage receptacle therein comprising a cover and a base, said base being supported for substantially horizontal sliding movement relative said cover, said cover having a downwardly-turned rear portion which cooperates with said base to substantially close said receptacle when the base is in the substantially closed position, and a lamp in said chamber for illuminating the interior thereof, the luminuous portion of said lamp being located below the downwardly-turned rear portion of said cover, said lamp being positioned to illuminate the upper interior surface of said cover through the opening formed between the downwardly-turned portion of the cover and said base when the latter is slid from the substantially closed position, said upper interior surface of said cover reflecting said illumination downwardly.

7. In a refrigerator, the combination of an insulated chamber, a door therein, a substantially closed food storage receptacle therein comprising a cover and a base, said base being supported for substantially horizontal sliding movement relative said cover from the substantially closed position of said vessel to the open position thereof, said cover having a downwardly-turned rear portion which cooperates with said base to substantially close said receptacle, and a lamp in said chamber for illuminating the interior thereof, said lamp being controlled by said door to light when the door is opened, said lamp being located below the downwardly-turned rear portion of said cover to illuminate the upper interior surface of said cover through the opening formed between the downwardly-turned portion of the cover and said base when the latter is slid from the substantially closed position, said upper interior surface of said cover reflecting said illumination downwardly.

8. In a refrigerator, the combination of an insulated chamber, a substantially closed food storage receptacle therein comprising upper and lower portions, said upper portion having an interior light reflecting surface spaced from said lower portion, the front of said receptacle being formed, at least in part, of a transparent material, and an illuminating lamp in said chamber and outside of said receptacle, said lamp being so positioned with respect to said receptacle that light from said lamp illuminates the upper interior light reflecting surface of said upper portion and said surface reflects the light downwardly toward said lower portion to illuminate the interior of said receptacle and the food stored therein.

ORLAND H. YOXSIMER.